INVENTOR
William B. New

United States Patent Office

3,224,218
Patented Dec. 21, 1965

3,224,218
AIR COOLING AND LIQUID SUPPLY SYSTEMS
FOR AUTOMOBILES
William B. New, 1412 NW. 11th Place,
Fort Lauderdale, Fla.
Filed Mar. 7, 1962, Ser. No. 178,093
2 Claims. (Cl. 62—239)

This invention relates to cooling and liquid supply systems for inclosed spaces, and more particularly to such systems for increasing the comforts of the occupants of automobiles.

It is an object of the invention to provide an air cooling device using a block of ice inside an air tight compartment having projecting fins over which the air to be cooled passes in forced circulation throughout the car.

Another object of the present invention is the provision of a device fastened under the dash board or instrument panel inside an automobile and having means for supplying ice water and hot water to a plurality of taps over a secured tray holding cups or glasses.

A further object is to provide a novel and efficient air cooling device for a car and having an hermetic container for the cold storage of food products during an extended automobile trip.

Another object is the provision of a compact device having ample circulating cool air whether the automobile is moving or standing still.

Another object is the ready conversion of the device to circulate hot air instead of cold air.

Still another object is the provision of a device having a novel construction to permit the quick conversion of a cooling compartment into a cooking compartment for the preparation of hot meals.

These and other objects will be apparent from the following description when considered in conjunction with the accompanying drawings, wherein FIG. 1 is a longitudinal section through the device disclosing one embodiment of the invention as mounted under the dash of the automobile with easy access for the occupants of the front seat;

Figure 1:
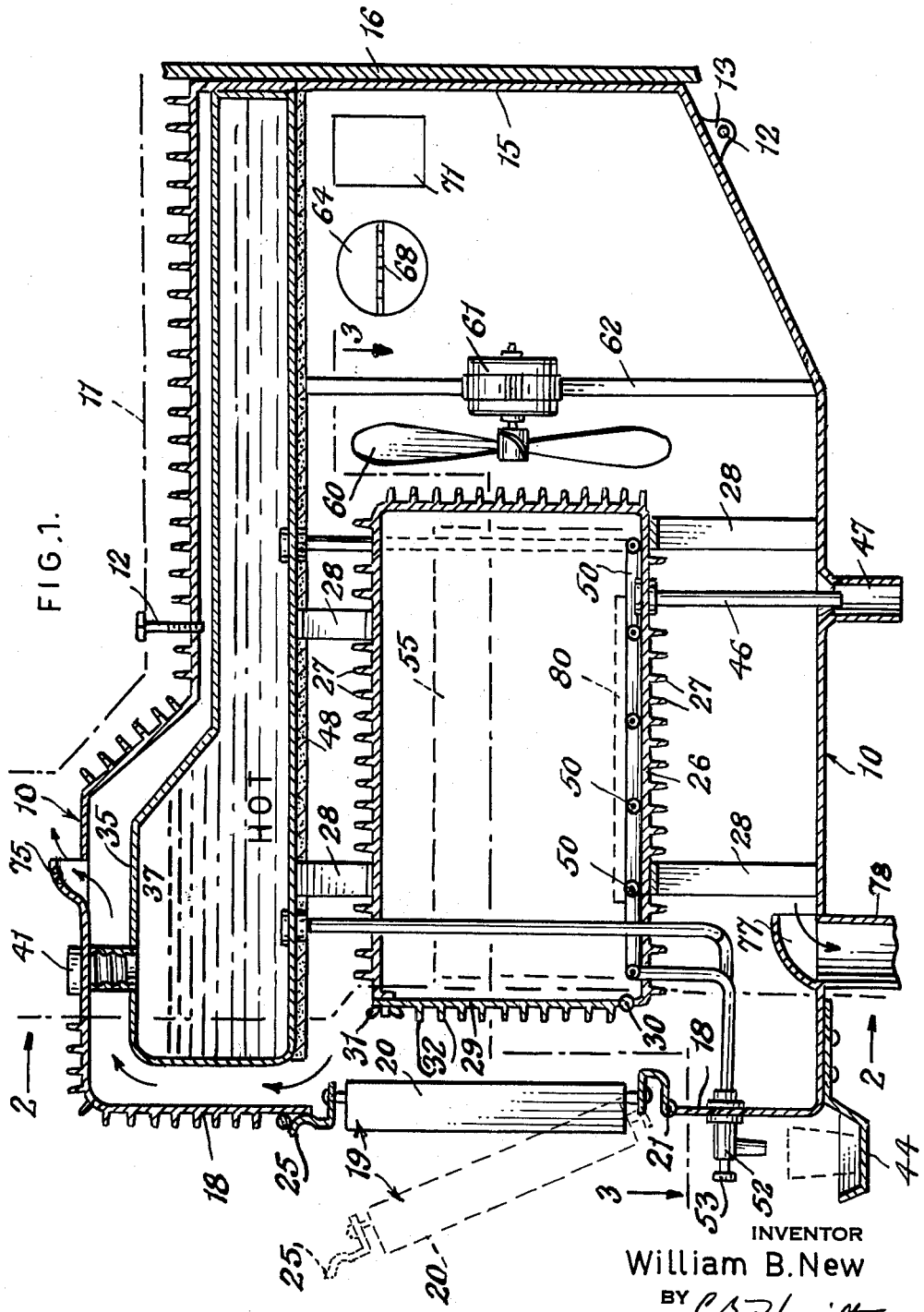

Referring now in detail to the drawings wherein like reference numerals designate the same parts throughout the several views, a casing 10 is secured underneath the dash board or instrument panel 11 by bolts 12 secured to the body of the automobile and threaded into the casing 10 and also by bolts passing through holes in projecting flanges 13 integral with the casing.

The back wall 15 of the casing 10 abuts against and may be secured to a fire wall 16 of the car, which wall separates the engine from the occupants in the front seat of the automobile. The front wall 18 of the casing has an opening in which is fitted an outer door 19 swinging about a horizontal pivot 21 comprising a plurality of adjustable spaced vertical vents 20 for controlling the direction of air flowing therethrough from inside the casing 10 toward the front seat of the automobile.

The outer door 19 is hinged at 21 to the casing wall 18 so as to swing down and outward. When door 19 is closed it is held in position by latches 25.

Directly opposite the outer door 19 and mounted inside the casing 10 is a stainless steel or aluminum air tight container 26 spaced from the casing walls and having projecting cooling fins 27. This container 26 is supported inside the casing by a plurality of brackets 28. The front end of the container has an inner door 29 pivoted at 30 and is held in air tight position by a series of spaced thumb nuts 31 around the periphery of the door to provide a quick means for sealing and opening this door. The door 29 is covered with a plurality of spaced projecting fins 32.

Positioned above and in spaced relationship to the air tight or hermetic ice container 26 and spaced from the walls of the casing 10 is a water tank 35 having two compartments 36 and 37 (FIG. 2) for cold and hot water, respectively, and this tank is held in position by a plurality of flanges 40 secured to the inner walls of the casing 10.

Figure 3:
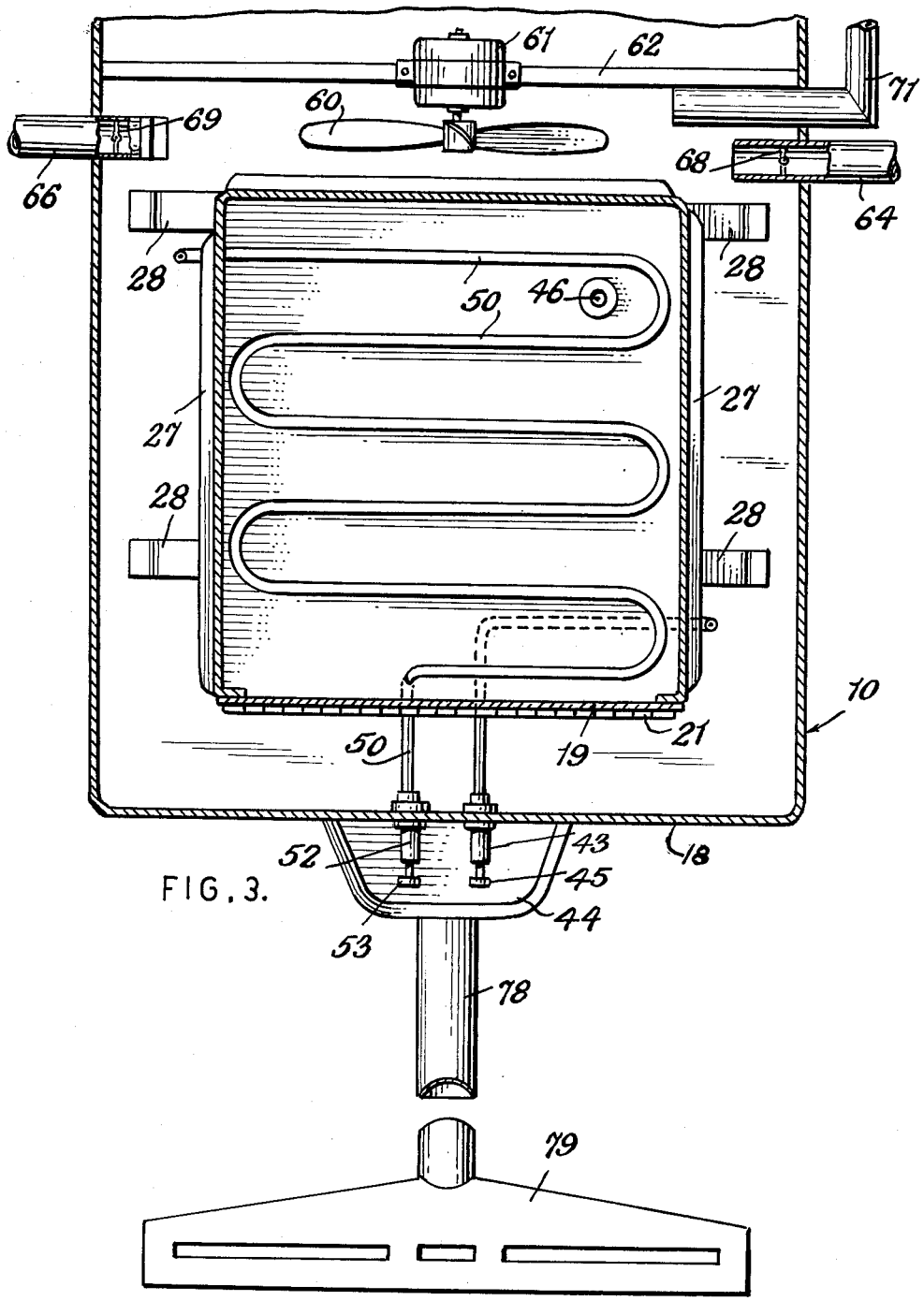
FIG. 3 is an enlarged sectional plan view looking down along the lines 3—3 of FIG. 1.

The hot water compartment 37 of the tank 35 has a filler cap 49 at the top, and the bottom is connected to a pipe 42 terminating in a tap 43 (FIG. 3) secured in and extending from the lower front casing wall 18 above a cup tray 44 secured to the front underside of casing 10 (FIG. 1). Hot water tap 43 has a spring retractable push button 45 for withdrawing hot water as desired.

The tank 35 is protected by insulating material 48.

The cold water compartment 36 (FIG. 2) of the tank 35 has a filler cap 41 at its top, and a pipe 50 is connected in through the bottom. This pipe 50 passes into the air tight compartment 26 and is coiled over the floor thereof (FIG. 3) and terminates in a tap 52 extending through and connected to the lower front wall 18 of the casing 10 above the tray 44 as shown in FIG. 1. This tap 52 also has a convenient push button 53 for withdrawing ice cold water into a glass or cup resting on the tray 44.

Figure 2:
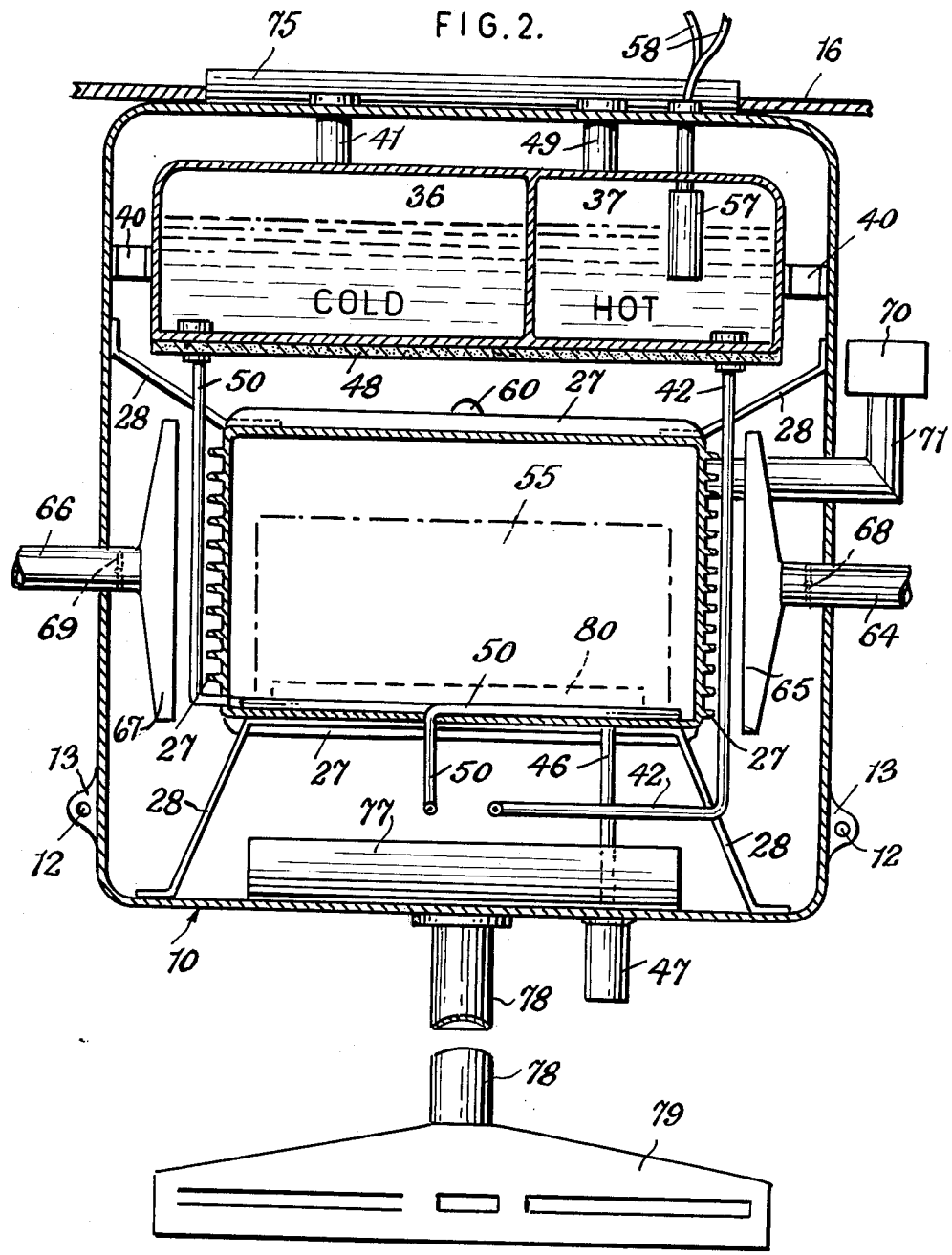
FIG. 2 is a cross section taken along the lines 2—2 of FIG. 1 and showing the separate compartments for hot and cold water mounted above the air tight container holding the block of ice and having an enclosed air space thereabout connected to the duct system for distributing cool air throughout the automobile.

A block of ice 55 designated in dot-dash lines is placed inside the air tight container 26 and rests on the coils of pipe 50 as indicated in FIGS. 1 and 2 to cool the water as it passes from compartment 36 through pipe 50 to tap 52. A drain pipe 46 is connected inside the bottom of container 26 and terminates in a larger drain 47 passing through a hole in the car floor. The larger drain 47 collects and takes care of any sweat or moisture running off the outside of drain pipe 46. Perishable food can be placed on the ice inside the air tight compartment for safe keeping.

An immersion type electrical heating element 57 is placed in compartment 37 to heat the water which flows through pipe 42 to tap 43. The heating element 57 is connected by wires 58 to the cigarette lighter socket in the dash of the automobile.

All of the large elements inside the casing 10 are spaced from each other and from the walls of the casing to permit free circulation of air inside the casing and over the fins 27, 32 of the aluminum or stainless steel ice container 26. Positioned at the rear of the container 26 is a blower fan 60 driven by a motor 61 which is connected to the car battery and is secured in position by a strut 62 fastened to the casing 10. A rheostat switch (not shown) is provided on the dash for controlling the speed of the motor 61 and its fan 60.

An air intake duct 64 (FIGS. 1 and 2) draws air in from under the right car fender and passes through a wall of the casing 10 and terminates therein in a wide horn shape opening 65 adjacent to the ice container 26. Another duct 66 open under the left fender of the automobile extends into the casing 10 and terminates in a large horn shape opening 67 adjacent to the ice container 26. Each of these ducts 64 and 66 inside the casing 10 have balanced dampers 68 and 69, respectively, which open when air enters to pass over the ice container 26 and these dampers 68–69 close automatically when the car is stopped thereby preventing the cool air inside the automobile from escaping.

When the automobile is standing still air may be forced over the ice container 26 by a blower fan 70 whose motor is connected to the car battery. A duct 71 carries the forced air from fan 70 to the external surface of the ice container 26. This blower 70 need not be used on moderate days while the automobile is moving since sufficient air is forced in by the movement of the car. When more air is needed the fan 60 may be operated at any desired speed by the rheostat switch on the dash. These blower fans 60 and 70 are particularly useful when the outside air is such that it is not necessary to put ice inside the container 26 and also may be used in the winter to thoroughly distribute warm air when a heater installed by the car manufacturer is put in use to heat the air inside the car and when ice is not being used.

When air circulates inside the casing 10, it passes over the fins 27, 32 on the ice container 26 and thence through an elongated arcuate duct 75 at the top of the casing 10 adjacent the inside of the windshield of the car to circulate cool air over the inside upper half of the automobile and over the windshield. Simultaneously, air is also forced from the casing 10 out between adjustable spaced vents of the door 19 (FIG. 1) to cool the occupants in the front seat of the car. At the same time, cool air is forced out through an elongated arcuate duct 77 inside the casing 10 through a duct 78 positioned on top of the longitudinal hump extending through the middle of the floor of the car. This duct 78 terminates in a large horn shaped open duct member 79 under the front car seat to distribute cool air along the floor to occupants in the rear car seat. Thus, by means of ducts 75, 77 and adjustable open vents on door 19, cool air is thoroughly and efficiently distributed throughout the inside of the automobile.

In summer, both hot and cold water can be drawn from the taps 43, 52 while the car is being cooled, whereas in winter, the ice is removed from the container 26, the doors 19 and 29 are left open and a removable electrical hot plate 80 (FIGS. 1 and 2) is placed on top of the coils 50 inside the container. The hot plate 80 is plugged into the cigarette lighter socket in the dash of the car so that hot meals can be prepared on the hot plate.

Thus the compact efficient and economical unit of this invention for providing air conditioning, supplying hot and cold water, storing of perishable food, and providing cooking facilities is a great boon to the occupants of automobiles, particularly parents with children.

A prepared embodiment of the present invention has been disclosed but it will be understood that various modifications and changes may be made without departing from the spirit and scope of the invention.

What is claimed is:

1. In combination with an automobile having an enclosed space with a windshield and an instrument panel, a casing secured approximately under the said panel, a liquid tank secured inside the casing and having separate compartments for holding liquids, filler caps for said compartments for admitting liquids, means connected to one of the compartments for conveying said liquid therein to a tap on the outside of said casing below the said instrument panel, a cooling container inside the casing and secured thereto, means connected to the other of the compartments and passing over the inside floor of the cooling container to cool and convey liquid to a tap on the said casing below the said panel, said last mentioned means passing over the floor of the container being adapted to store perishable foods thereon inside the container, a duct system connected to the outside of the automobile enclosed space and conveying air over and around said cooling container and thence throughout the said automobile enclosed space to cool and air condition it, means for forcing air through the said duct system, additional means inside the said casing for forcing the air throughout the inside of the casing into the duct system, and tray means attached to the said casing for holding cups and glasses adjacent the liquid supplying taps.

2. In a combined water supply, cooling and air conditioning system for an automobile having a power dash panel, a casing, an ice container having spaced exterior fins, means for mounting the said ice container inside the said casing, means supported by the said casing for receiving air from the outside and terminating in wide horn shaped openings adjacent the exterior fins of the said ice container inside the said casing, dampers connected in the said air receiving means for controlling the air flow, blowing means for circulating the air over the fins of said ice container, a water tank secured to the inside of the said casing and having individual compartments for providing water, means connected to one of of the compartments for conducting water to a water tap on the said casing, pipe means connected into the other of said individual water compartments and coiled over the floor of the said ice container to cool the water passing therethrough and terminating in a water tap on the said casing and adjacent the other water tap on said casing, and a quick opening door on the said ice container for permitting the removal of the ice from this container.

References Cited by the Examiner
UNITED STATES PATENTS

| | | | |
|---|---|---|---|
| 1,013,795 | 1/1912 | May | 62—398 |
| 1,069,489 | 8/1913 | Smith | 62—337 X |
| 1,251,411 | 12/1917 | O'Connor | 219—41 |
| 1,823,925 | 9/1931 | Woodson | 219—41 |
| 1,917,056 | 7/1933 | Peck | 62—337 |
| 2,074,074 | 3/1937 | Roren | 62—399 X |
| 2,097,705 | 11/1937 | Stuck | 219—41 |
| 2,186,562 | 1/1940 | Sperry | 165—43 |
| 2,209,430 | 7/1940 | Turshin | 222—146 X |
| 2,767,960 | 10/1956 | Fast | 165—14 |
| 2,975,797 | 3/1961 | Matheney | 165—42 |

ROBERT A. O'LEARY, *Primary Examiner.*

CHARLES SUKALO, *Examiner.*